United States Patent
Decraemer et al.

[11] Patent Number: 5,943,103
[45] Date of Patent: Aug. 24, 1999

[54] PICTURE DISPLAY APPARATUS WITH A CATHODE RAY TUBE AND A SELF-OSCILLATING SWITCHED-MODE POWER SUPPLY

[75] Inventors: Alain Decraemer, Garches; Jean-Claude Dormet, Chaville, both of France

[73] Assignee: U.S. Philips Corporation, New York, N.Y.

[21] Appl. No.: 08/762,655

[22] Filed: Dec. 9, 1996

[30] Foreign Application Priority Data

Dec. 20, 1995 [FR] France .................................. 95 15179

[51] Int. Cl.$^6$ ...................................................... H04N 5/63
[52] U.S. Cl. ........................................... 348/730; 315/411
[58] Field of Search ........................... 315/411; 348/730; 363/21; 331/112; 361/18, 90; 379/394, 413

[56] References Cited

U.S. PATENT DOCUMENTS

| | | | |
|---|---|---|---|
| 3,956,669 | 5/1976 | Del Ciello | 315/411 |
| 4,261,032 | 4/1981 | Cavigelli | 363/19 |
| 4,450,514 | 5/1984 | Peruth | 363/37 |
| 4,486,822 | 12/1984 | Marinus | 363/19 |
| 4,525,739 | 6/1985 | Fitzgerald | 348/730 |
| 4,593,347 | 6/1986 | Peruth et al. | 363/21 |
| 4,626,626 | 12/1986 | Coulmance | 379/394 |
| 4,648,016 | 3/1987 | Peruth et al. | 363/21 |
| 4,685,020 | 8/1987 | Driscoll et al. | 361/18 |
| 4,737,853 | 4/1988 | Graves et al. | 348/730 |
| 4,788,591 | 11/1988 | Decreamer | 348/730 |
| 4,937,727 | 6/1990 | Leonardi | 363/97 |
| 5,189,600 | 2/1993 | Keck et al. | 363/21 |
| 5,349,516 | 9/1994 | Megeid | 363/21 |
| 5,351,177 | 9/1994 | Megeid | 363/21 |
| 5,353,215 | 10/1994 | Dinwiddie et al. | 363/65 |
| 5,615,092 | 3/1997 | Helfrich | 363/21 |

OTHER PUBLICATIONS

European search report, for application No 96203524.2 of Dec. 12, 1996, search date Mar. 24, 1997. U.S. patent application paper number 4, Apr. 1997.

Primary Examiner—John K. Peng
Assistant Examiner—Stephen Thomas Boughner
Attorney, Agent, or Firm—Edward W. Goodman

[57] ABSTRACT

A picture display apparatus includes a non-synchronized self-oscillating switched-mode power supply (SMPS) associated with a line output stage (35) which generates power supply voltages for other elements of the apparatus, the standby state being obtained by stopping the line scan. The switch (1) of the SMPS is a MOS-type field effect transistor, and it is turned on by a winding (6) which is magnetically coupled to a ballast inductance (5), this winding (6) having one end connected to the connection point (50) between the switch and the ballast inductance, and generates, at its other end (51), a control voltage which is in phase opposition with the voltage generated in the ballast inductance, the control voltage being transmitted to the gate of the field-effect transistor (1). A capacitor (42) is arranged as a shunt across the drain-source path of the FET and creates an oscillating circuit together with the ballast inductance (5).

6 Claims, 2 Drawing Sheets

PICTURE DISPLAY APPARATUS WITH A CATHODE RAY TUBE AND A SELF-OSCILLATING SWITCHED-MODE POWER SUPPLY

BACKGROUND OF THE INVENTION

1. Field of the Invention

The invention relates to a picture display apparatus with a cathode ray tube, comprising a standby device which remains active in a standby state of the apparatus, and a self-oscillating switched-mode power supply (SMPS) comprising, in cascade between two terminals of a source of direct current obtained by line voltage rectification, a switch, a ballast inductance, and the supply current path of a line output stage which generates power supply voltages for different elements of the device to be insulated from the line voltage, the standby state being obtained by stopping the line scan while the SMPS is always active and feeds the standby device, the SMPS switch, which has successive periods of conductance and non-conductance, being rendered non-conducting at the end of each period of conductance by means of a blocking arrangement which measures the current in the switch and controls the operation of rendering said switch non-conducting when the measured current exceeds a predetermined value.

The invention is applicable, inter alia, in the field of television and monitors.

2. Description of the Related Art

An SMPS is known from U.S. Pat. No. 4,788,591. It comprises a blocking arrangement which measures the current in the switch and controls the operation of rendering this switch non-conducting when the measured current exceeds a predetermined value. The assembly controlling the successive periods of conductance and non-conductance is, however, relatively complex.

SUMMARY OF THE INVENTION

It is an object of the invention to simplify the control in such a way that a control at both low cost and great reliability is obtained.

To this end, the switch, being a MOS-type field-effect transistor, is turned on at the start of each period of conductance by means of a winding which is magnetically coupled to the ballast inductance, this winding having one end connected to a connection point between the switch and the ballast inductance so as to generate, at its other end, a control voltage which, with respect to the connection point, is in phase opposition with the voltage generated in the ballast inductance, said control voltage being transmitted to the gate of the field effect transistor via a first capacitor, while a second capacitor is arranged as a shunt across the drain-source path of the field effect transistor.

The terminal of the DC source connected to the field-effect transistor being referred to as first terminal, the blocking arrangement is preferably connected between the gate of the MOS transistor and the second terminal of the DC source, and comprises a current-measuring resistor which is inserted between the line output stage and the second terminal, the blocking arrangement being advantageously constituted essentially by a blocking transistor having its main current path between the gate of the MOS transistor and the second terminal of the DC source, and its base-emitter path coupled to the current-measuring resistor.

The blocking arrangement and the means for rendering the switch conducting thus cooperate in a simple manner.

The apparatus advantageously comprises a control circuit connected between a terminal which holds the power supply voltage of the line output stage and the base of the blocking transistor.

The blocking arrangement and the control circuit thus cooperate in a simple manner.

The standby circuit is advantageously fed from a rectifier arrangement connected to an additional winding which is magnetically coupled to the ballast inductance.

This ensures power supply of the standby circuit during the standby periods.

These and other aspects of the invention will be apparent from and elucidated with reference to the embodiments described hereinafter.

DESCRIPTION OF THE PREFERRED EMBODIMENTS

The invention will be described with reference to a television set, but it is also applicable to any other picture display apparatus, for example, a monitor.

Figure 1:
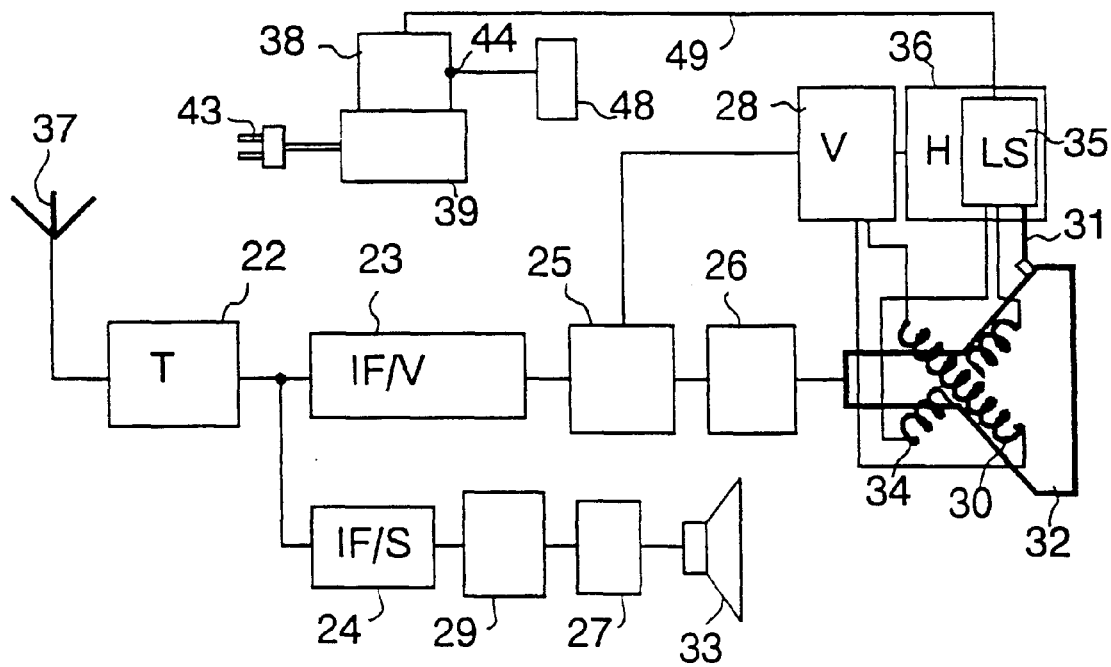
FIG. 1 shows diagrammatically, a picture display apparatus with a cathode ray tube and a line output stage, a standby device and a self-oscillating switched-mode power supply (SMPS)

The television set, which is shown in a diagram in FIG. 1, comprises a tuner 22 for receiving a signal, for example, from an antenna 37 and for transposing the frequency of the apparatus to intermediate frequencies intended for a subsequent IF video amplifier 23 and an IF audio amplifier 24. The IF audio amplifier 24 is followed by a demodulator 29 which supplies the audio signals in the baseband to an audio output amplifier 27 feeding a loudspeaker 33. The IF video amplifier 23 is followed by a unit video processor/sync. separator 25 which supplies a video signal in the baseband to a video amplifier 26 supplying the signals ad hoc to the electrodes of a cathode ray tube 32. The video processor/sync. separator unit 25 also extracts, from the signal, synchronizing signals which are applied to a line scanning circuit 36 and a field scanning circuit 28. The field scanning circuit 28 supplies a current in a field deflection coil 30. The line scanning circuit 36 comprises an output stage 35 which supplies a current in a line deflection coil 34 and generates a voltage, referred to as "extra-high tension" (EHT) of approximately 25 kV for supplying power to the screen of the display tube via a connection 31. The line output stage 35 is fed via a connection 49 by a self-oscillating switched-mode power supply circuit 38 which itself is DC-fed by a DC soure 39 of known type which can be connected to the line voltage by means of a current terminal 43 and is essentially constituted by a rectifier assembly and a storage capacitor. The other circuits 22–29, which must be insulated from the line voltage are fed in known mariner from the line output stage 35 through connections which, for the purpose of simplifying the Figure, are not shown. The switched-mode power supply 38 is not synchronized with the line frequency. A standby device 48, which remains active in a standby state of the apparatus, is directly fed by the SMPS 38. The standby state is obtained by stopping the line output stage 35, which suppresses the supply of the circuits 22–29 from the line output stage 35, while the SMPS 38 is always active and feeds the standby device 48.

Figure 2:
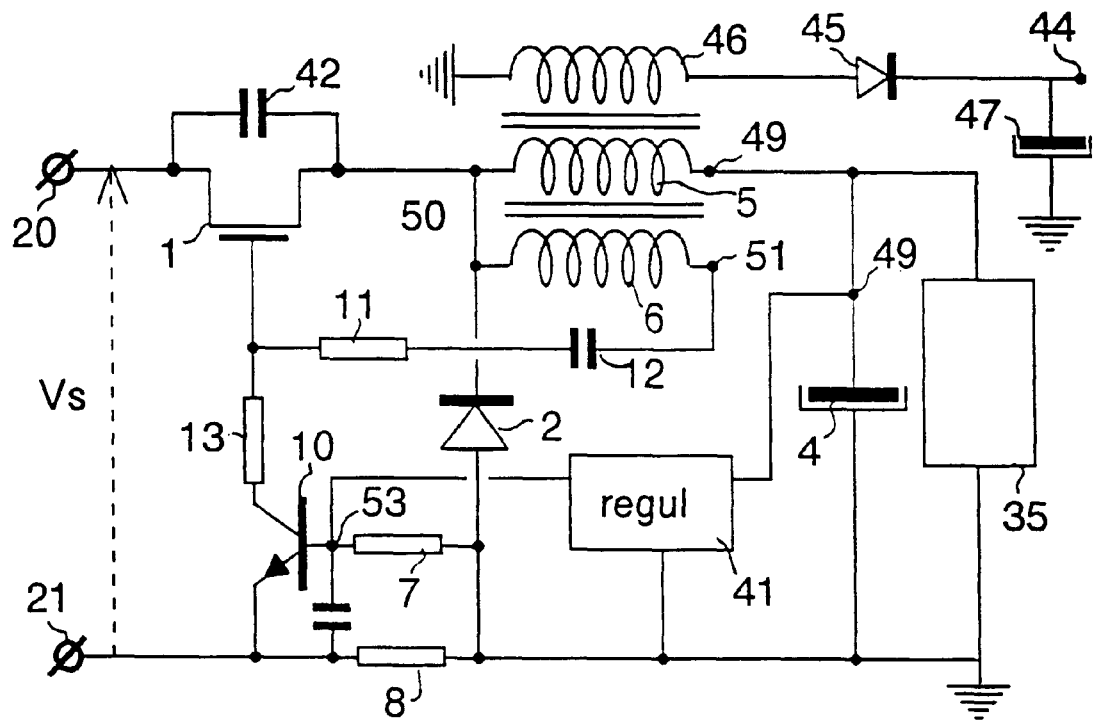
FIG. 2 shows diagrammatically, a self-oscillating SMPS.

The SMPS of FIG. 2 corresponds to the SMPS 38 of FIG. 1. The DC source 39 in FIG. 1 provides a voltage Vs of about 300 V, obtained by a rectifier bridge if the mains is 220 V, or by a doubler in the case of 110 V. This voltage is applied between a first terminal 20 and a second terminal 21, with its positive pole, for example, at the terminal 20. The polarity types of the semiconductors mentioned hereinafter are derived from this polarity.

The power supply comprises, in cascade from the terminal 20, a switch consisting of an N-channel, enhancement-mode MOS field-effect transistor 1, and a ballast inductance 5 connected to a power supply input of the line output stage 35 in which the power supply current path ends at the terminal 21. The line output stage 35 is shunted by a storage capacitor 4 and the assembly consisting of the line output stage 35 in cascade with the winding 5 is shunted by a recovery diode 2. The operation of the elements 1, 5, 4, 2, 35 mentioned above is well known. The power supply voltage supplied to the line output stage 35 is, for example, 100 V.

The switch for the SMPS, namely the transistor 1, has successive periods of conductance and non-conductance. The operation of rendering it non-conducting is controlled by a blocking arrangement which measures the current and controls the blocking of transistor 1 when the measured current exceeds a predetermined value. This arrangement is essentially constituted by transistor 10 of the NPN type, referred to as blocking transistor, having its main current path between the gate of MOS transistor 1 and the second terminal 21 of the DC source, in series with a resistor 13, and having its base-emitter path connected to a current measuring resistor 8 which is inserted between the line output stage 35 and the second terminal 21. The current which flows through the resistor 8 is substantially the same as that which flows through the transistor 1. The voltage generated by the current in the resistor 8 is transmitted to the base 53 of the transistor 10 via a resistor 7.

One end of a winding 6, which is magnetically coupled to the ballast inductance 5, is connected to the point 50 between a transistor 1 and the inductance 5. This winding is coiled in such a sense that it generates, between its other end 51 and the point 50, a control voltage which is in phase opposition with the voltage generated in the ballast inductance, i.e., with the voltage between the point 49 and the point 50. The other end 51 is connected to the gate of the field-effect transistor via a first capacitor 12 in series with a resistor 11. A second capacitor 42 is arranged as a shunt onto the drain-source path of the field-effect transistor.

The standby circuit 48 shown in FIG. 1 is supplied by a terminal 44 of the SMPS from a rectifier arrangement consisting of a diode 45 and a storage capacitor 47 connected to an additional winding 46 which is magnetically coupled to the ballast inductance 5.

Figure 3:
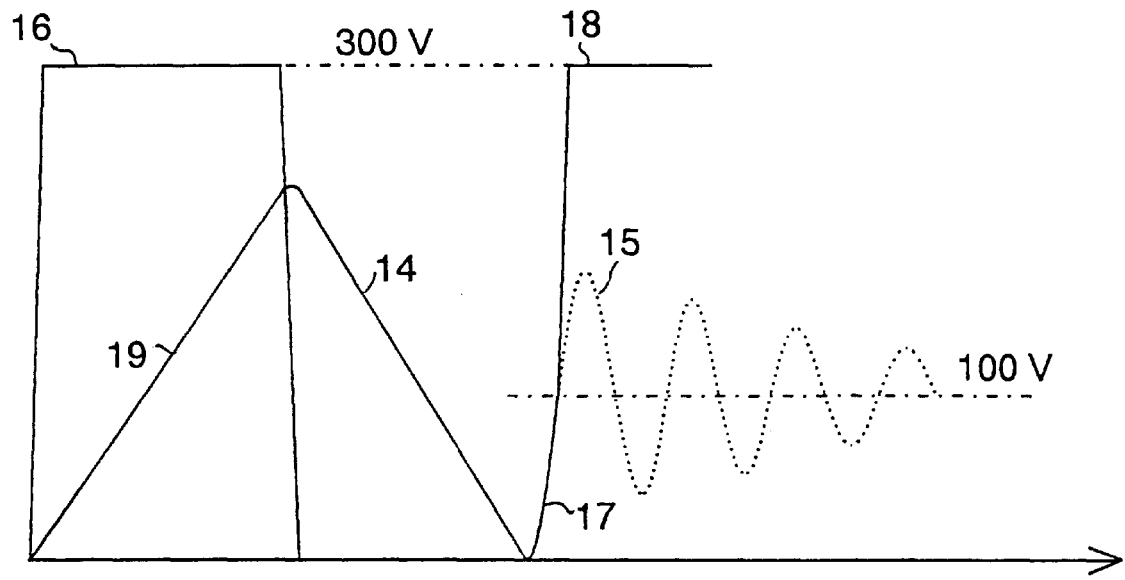
FIG. 3 shows curves to illustrate the operation of the SMPS.

The operation of this assembly will be explained with reference to the characteristic curves in FIG. 3 and the diagram in FIG. 2. Let it be assumed that the transistor 1 is turned on. The voltage at the point 50 in FIG. 2, indicated by the reference numeral 16 in FIG. 3, is 300 V: if neglecting the voltage at the terminals of the transistor 1, the terminal 49 is at 100−300=−200 V with respect to the terminal 50. As the windings 5 and 6 operate as a transformer, a positive voltage is generated at the point 51 with respect to the point 50. This voltage, transmitted to the gate of transistor 1 by the capacitor 12 and the resistor 11, maintains the transistor 1 conducting. The voltage at the terminals of the inductance 5, between the point 50 and the point 49, being fixed, the current in this inductance 5, indicated by the reference numeral 19, and also flowing in the transistor 1 and in the resistor 8, has an approximately linear growth. Let it be assumed, for example, that the resistor 8 has a value of 0.56 ohm. When the current reaches approximately 1.8 amperes, it will develop a voltage of 1 Volt which, via the resistor 7, renders the transistor 10 conducting. The lower end of the resistor 13 then decreases to almost zero volt. The voltage applied to the gate of transistor 1 is that of the left plate of the capacitor 12 but is decreased by the divider bridge effect of the resistors 11 and 13. The transistor 1 becomes non-conducting. At this instant, the current in the inductance 5, which cannot disappear in one go, ends via the recovery diode 2 which becomes conducting. The voltage at the point 50 therefore decreases to approximately −0.8 V. Thus, there is approximately 101 V between the terminal 49 and the terminal 50. As the windings 5 and 6 always operate as a transformer, a negative voltage is generated at the point 51 with respect to the point 50. This voltage, transmitted to the gate of transistor 1, confirms and reinforces the blocking operation. As the current no longer flows in the resistor 8, the transistor 10 becomes non-conducting again and the voltage again builds up at its collector, but as a consequence of the voltage applied by the winding 6, this does not render the transistor 1 conducting. From this instant, the current, indicated by the reference numeral 14, decreases in an approximately linear manner. When it has become zero, the capacitor 42 will start resonating with the inductance 5, which triggers a free oscillation; the reference numeral 15 shows what this oscillation would look like if it could last. However, when the voltage at the point 50 exceeds 100 V, i.e., when it becomes higher than the voltage at the point 49, a positive voltage will again be induced at the point 51, this voltage being transmitted to the gate of transistor 1 and rendering this transistor conducting. The oscillation 15 is then stopped and the voltage at the point 50 builds up to 300 V, as indicated at 18.

Figure 4:
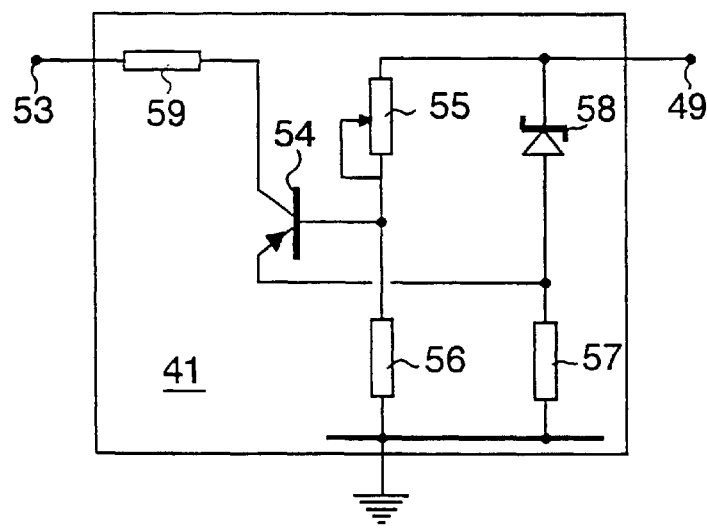
FIG. 4 shows diagrammatically, a control module suitable for controlling the SMPS.

A control circuit 41 is connected between the terminal 49, having the power supply voltage of the line output stage, and the connection to the base 53 of the blocking transistor 10. This circuit, which is of a known type and is based on the comparison between a voltage of a zener diode and a fraction of the power supply voltage, is illustrated in FIG. 4. It comprises, between the terminal 49 and ground, two cascade arrangements: that of a zener diode 58 and a resistor 57, and that of a controllable resistor 55 and a resistor 56. The junction point of the first-mentioned cascade arrangement is connected to the emitter of a transistor 54 of the PNP type, and the junction point of the secondly mentioned cascade arrangement is connected to the base of this transistor, whose collector is connected via a resistor 59 to the base 53 of the transistor 10 in FIG. 2. With the zener diode being for example, a 5 V model, the emitter voltage of transistor 54 is of about 95 V which is higher than the base voltage of the transistor 10 in FIG. 2. The transistor 54 thus adds a DC current in the resistor 7, this DC current shifting the triggering threshold of the transistor 10.

In a satisfactory embodiment, the power supply comprises the following essential components:

transistor 1=BUK444, transistor 10=BF487, transistor 54=BF423, diode 2=BYD34, zener diode 58=BZX79-C5V6 capacitor 42=330 pF, capacitor 12=33 nF, resistor 11=1.8 kΩ, resistor 13=6.8 kΩ, resistor 8=0.56 Ω, resistor 7=330 Ω, resistor 57=33 kΩ, resistor 55=10 kΩ, resistor 56=100 kΩ, resistor 59=10 kΩ.

The line output stage 35 may be de-activated by known means which does not form part of the invention, in such a way that the module 35 no longer supplies voltages to the other elements 22–28 in FIG. 1, with the effect that the apparatus is in a standby state and that the line output stage consumes hardly any current. The known means in question may consist of, for example, a control for the user who, by means of an opto-coupler inserted in a signal connection of the line output stage, interrupts this signal and stops the scan. The currents in the power supply are then very small, but the control circuit 41 maintains the voltage of 100 V, and as that of 300 V is always also present, the voltage at the terminals of the inductance 5 remains unchanged and thus also the voltage at the terminals of the winding 46; the standby circuit 58 is always supplied with the same voltage.

What is claimed is:

1. A picture display apparatus comprising:

a DC voltage source for supplying a DC voltage between a first terminal and a second terminal, said DC voltage source rectifying a line voltage;

a cathode ray tube;

a standby device which remains active in a standby state of the apparatus; and a self-oscillating switched-mode power supply connected to the first and second terminals of the DC voltage source, wherein said self-oscillating switched-mode power supply comprises:

a switch having an input coupled to the first terminal, said switch being a MOS-type field-effect transistor;

a ballast inductance having a first end coupled to an output of said switch;

an output stage of a line-scanning circuit having a first terminal coupled to a second end of the ballast inductance, and a second terminal coupled to the second terminal of the DC voltage source, said output stage of the line-scanning circuit being supplied by the self-oscillating switched-mode power supply, and, in turn, generating power supply voltages for different elements of the picture display apparatus;

a storage capacitance coupled between the second end of the ballest inductance and the second terminal of the DC voltage source in parallel to the output stage of the line-scanning circuit; and an arrangement for switching ON and OFF the switch, the standby state being obtained by de-activating the line output stage while the switched-mode power supply is always active and supplies power to the standby device;

characterized in that said arrangement for switching ON and OFF the switch comprises:

a winding magnetically coupled to the ballast inductance, said winding having a first end connected to a connection point between said switch and the ballast inductance so as to generate, at a second end of the winding, a control voltage which, with respect to the connection point, is in phase opposition with a voltage generated in the ballast inductance;

a first capacitor coupling said second end of the winding to a gate of the MOS-type field-effect transistor for applying said control voltage to the gate for maintaining the switch conductive during each period of conductance, and for maintaining the switch non-conductive during each period of non-conductance;

a second capacitor arranged as a shunt across the drain-source path of the MOS-type field-effect transistor, for generating a free-oscillation with the inductance of the windings, then rendering said switch conductive after a given delay of non-conductance; and means for measuring a current through said switch, and for turning the switch OFF when the measured current exceed a predetermined value, at the end of each period of conductance.

2. A picture display apparatus as claimed in claim 1, characterized in that the means for measuring the current and for turning OFF the switch comprises a current measuring resistor connected in the main current path of the switch, and a circuit for shorting the gate of the MOS-type field-effect transistor to the second terminal of the DC source when the voltage across said current measuring resistor exceeds a predetermined value.

3. A picture display apparatus as claimed in claim 2, characterized in that the shorting circuit comprises a blocking transistor having a main current path arranged in series with a resistor between the gate of the MOS-type field-effect transistor and the second terminal of the DC source, and a base-emitter path coupled to the current-measuring resistor.

4. A picture display apparatus as claimed in claim 3, characterized in that said picture display apparatus further comprises a control circuit connected between a terminal carrying the power supply voltage for the line output stage, and a base of the blocking transistor.

5. A picture display apparatus as claimed in claim 1, characterized in that the standby circuit is fed from a rectifier arrangement connected to an additional winding which is magnetically coupled to the ballast inductance.

6. A picture display apparatus as claimed in claim 3, characterized in that said arrangement for switching ON and OFF the switch comprises means for turning the switch ON, said turning ON means comprising a resistor in series with said first capacitor.

* * * * *